United States Patent
Shin et al.

(10) Patent No.: US 9,559,765 B2
(45) Date of Patent: Jan. 31, 2017

(54) APPARATUS AND METHOD FOR RELIEVING INTERFERENCE IN WIRELESS COMMUNICATION SYSTEM

(71) Applicants: Samsung Electronics Co., Ltd., Gyeonggi-do (KR); KOREA ADVANCED INSTITUTE OF SCIENCE AND TECHNOLOGY, Daejeon (KR)

(72) Inventors: Dae-Kyu Shin, Daejeon (KR); Wan Choi, Daejeon (KR); Myung-Gil Kang, Daejeon (KR); Hyun-Kyu Yu, Gyeonggi-do (KR)

(73) Assignee: SAMSUNG ELECTRONICS CO., LTD, Suwon-si, Gyeonggi-do (KR)

( * ) Notice: Subject to any disclaimer, the term of this patent is extended or adjusted under 35 U.S.C. 154(b) by 136 days.

(21) Appl. No.: 14/011,561

(22) Filed: Aug. 27, 2013

(65) Prior Publication Data
US 2014/0056207 A1     Feb. 27, 2014

(30) Foreign Application Priority Data
Aug. 27, 2012    (KR) .................. 10-2012 0093535

(51) Int. Cl.
| H04B 7/06 | (2006.01) |
| H04J 11/00 | (2006.01) |
| H04B 7/08 | (2006.01) |
| H04L 25/03 | (2006.01) |
| H04B 1/12 | (2006.01) |
| H04B 1/7107 | (2011.01) |

(52) U.S. Cl.
CPC .......... *H04B 7/0615* (2013.01); *H04B 7/0842* (2013.01); *H04J 11/0053* (2013.01); *H04L 25/0328* (2013.01); *H04B 1/12* (2013.01); *H04B 1/7107* (2013.01)

(58) Field of Classification Search
CPC ....... H04B 7/0615; H04B 7/0842; H04B 1/12; H04B 1/7107; H04L 25/0328; H04J 11/0053
See application file for complete search history.

(56) References Cited

U.S. PATENT DOCUMENTS

| | | | | |
|---|---|---|---|---|
| 2009/0221315 | A1* | 9/2009 | Kim et al. | 455/517 |
| 2010/0232537 | A1* | 9/2010 | Park et al. | 375/267 |
| 2011/0218000 | A1* | 9/2011 | Noh et al. | 455/501 |
| 2014/0146756 | A1* | 5/2014 | Sahin | H04L 1/0025 370/329 |

FOREIGN PATENT DOCUMENTS

KR    10-2010-0112754     10/2010

\* cited by examiner

*Primary Examiner* — Joshua Kading (57) ABSTRACT

An apparatus and a method relieve intercell interference in a wireless communication system. In a method for operating a transmission node, a first private message encoding a portion of transmission data of a neighbor transmission node is received. Weight for canceling the first private message of the neighbor transmission node received in a intended reception node is determined. The first private message of the neighbor transmission node multiplied by the weight, a common message encoding a portion of data to be transmitted to the intended reception node, and a second private message encoding the rest of the data are transmitted.

20 Claims, 7 Drawing Sheets

APPARATUS AND METHOD FOR RELIEVING INTERFERENCE IN WIRELESS COMMUNICATION SYSTEM

PRIORITY

The present application is related to and claims the benefit under 35 U.S.C. §119(a) of a Korean patent application filed in the Korean Intellectual Property Office on Aug. 27, 2012 and assigned Serial No. 10-2012-0093535, the entire disclosure of which is hereby incorporated by reference.

TECHNICAL FIELD

The present disclosure relates to a technology for relieving an intercell interference in a wireless communication system.

BACKGROUND

In a wireless communication system, a base station (BS) provides a wireless access to terminals located inside a predetermined physical area, and an area covered by each base station is called a cell. Generally, one terminal receives a Radio Frequency (RF) signal from one base station and accordingly, a signal from other base stations acts as interference. This problem may be a cause of more serious performance deterioration in cells of a narrower radius such as a micro cell, a femto cell, a pico cell, etc. recently suggested for providing even more improved performance and capacity.

As a technology for relieving an intercell interference, an interference align technique, a rate divide technique, an interference neutralize technique, etc. have been suggested. In the interference align technique, a transmission end transmits information using a half dimension, allowing a signal to be received in another reception end, which is not a intended reception end, in an interference align dimension, and allowing a signal to be received in the intended reception end in the other half dimension which is not the interference align dimension. The rate divide technique denotes a method of dividing a message into partial messages of two kinds and transmitting them. The interference neutralize technique is a technique of adding, a signal that may remove a signal acting as an interference to a signal transmitted by a transmission end to cancel the interference signal.

The interference align technique has an advantage of obtaining its signal in perfection with respect to a half dimension without an interference but the other half dimension is not utilized, so that a loss in the given dimension occurs. Also, since all of interference information is thrown away, a characteristic by the size of an interference channel cannot be utilized. Accordingly, in the case where intensity of a signal is small, large performance deterioration may be caused. In addition, there is a limitation that all transmission ends should know all of interference channel information related to other transmission ends in order to perforin the interference align technique. Since the rate divide technique may decode a portion of interference, a higher performance than the conventional art may be obtained under a limited power circumstance. In case of a cooperative model where information exchange between transmission ends exists, an additional supplement for improving performance is needed. The interference neutralize technique has an advantage of utilizing all of given entire dimension compared to the interference align technique which may not utilize a half dimension. However, a problem of a power loss for interference neutralization exists.

Therefore, an alternative for solving a disadvantage while maintaining an advantage by supplementing the above-described techniques is needed.

SUMMARY

To address the above-discussed deficiencies of the prior art, it is a primary object to provide at least the advantages described below. Accordingly, an aspect of the present disclosure is to provide an apparatus and a method for relieving an intercell interference in a wireless communication system.

Another aspect of the present disclosure is to provide an apparatus and a method for reducing or minimizing unnecessary power consumption when relieving intercell interference in a wireless communication system.

Still another aspect of the present disclosure is to provide an apparatus and a method for canceling interference by a neighbor transmission node in a wireless communication system.

Yet another aspect of the present disclosure is to provide an apparatus and a method for determining weight for canceling interference by a neighbor transmission node in a wireless communication system.

In accordance with an aspect of the present disclosure, a method for operating a transmission node in a wireless communication system is provided. The method includes receiving a first private message encoding a portion of transmission data of a neighbor transmission node, determining weight for canceling the first private message of the neighbor transmission node received in a intended reception node, transmitting the first private message of the neighbor transmission node multiplied by the weight, a common message encoding a portion of data to be transmitted to the intended reception node, and a second private message encoding the rest of the data, wherein the common message is a message decodable by other reception nodes as well as the intended reception node, and the private message is a message decodable by only the intended reception node.

In accordance with another aspect of the present disclosure, a method for operating a reception node in a wireless communication system is provided. The method includes receiving a signal from a serving transmission node and a neighbor transmission node, decoding a common message of the serving transmission node, and decoding a second private message of the serving transmission node, wherein the common message is a message decodable by other reception nodes as well as a intended reception node, and the private message is a message decodable by only the intended reception node, and a signal received from the serving transmission node includes the common message of the serving transmission node, the second private message of the serving transmission node, a first private message of the neighbor transmission node multiplied by weight for canceling the first private message of the neighbor transmission node received from the neighbor transmission node.

In accordance with further another aspect of the present disclosure, a transmission node apparatus in a wireless communication system is provided. The apparatus includes a backhaul communication unit for receiving a first private message encoding a portion of transmission data of a neighbor transmission node, a controller for determining, weight for canceling the first private message of the neighbor transmission node received in a intended reception node, and a modem for transmitting the first private message of the neighbor transmission node multiplied by the weight, a common message encoding a portion of data to be transmitted to the intended reception node, and a second private message encoding the rest of the data, wherein the common message is a message decodable by other reception nodes as well as the intended reception node, and the private message is a message decodable by only the intended reception node.

In accordance with still another aspect of the present disclosure, a reception node apparatus in a wireless communication system is provided. The apparatus includes a modem for receiving a signal from a serving transmission node and a neighbor transmission node, and a controller for decoding a common message of the serving transmission node and decoding a second private message of the serving transmission node, wherein the common message is a message decodable by other reception nodes as well as a intended reception node, and the second private message is a message decodable by only the intended reception node, and a signal received from the serving transmission node includes the common message of the serving transmission node, the second private message of the serving transmission node, a first private message of the neighbor transmission node multiplied by weight for canceling the first private message of the neighbor transmission node received from the neighbor transmission node.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, the present disclosure describes a technology for relieving an intercell interference in a wireless communication system.

The present disclosure describes an embodiment using a circumstance where three base stations and three terminals exist as an example. The following wing embodiment is a mere example for explaining the present disclosure, and the present disclosure is not limited thereto.

Figure 1:
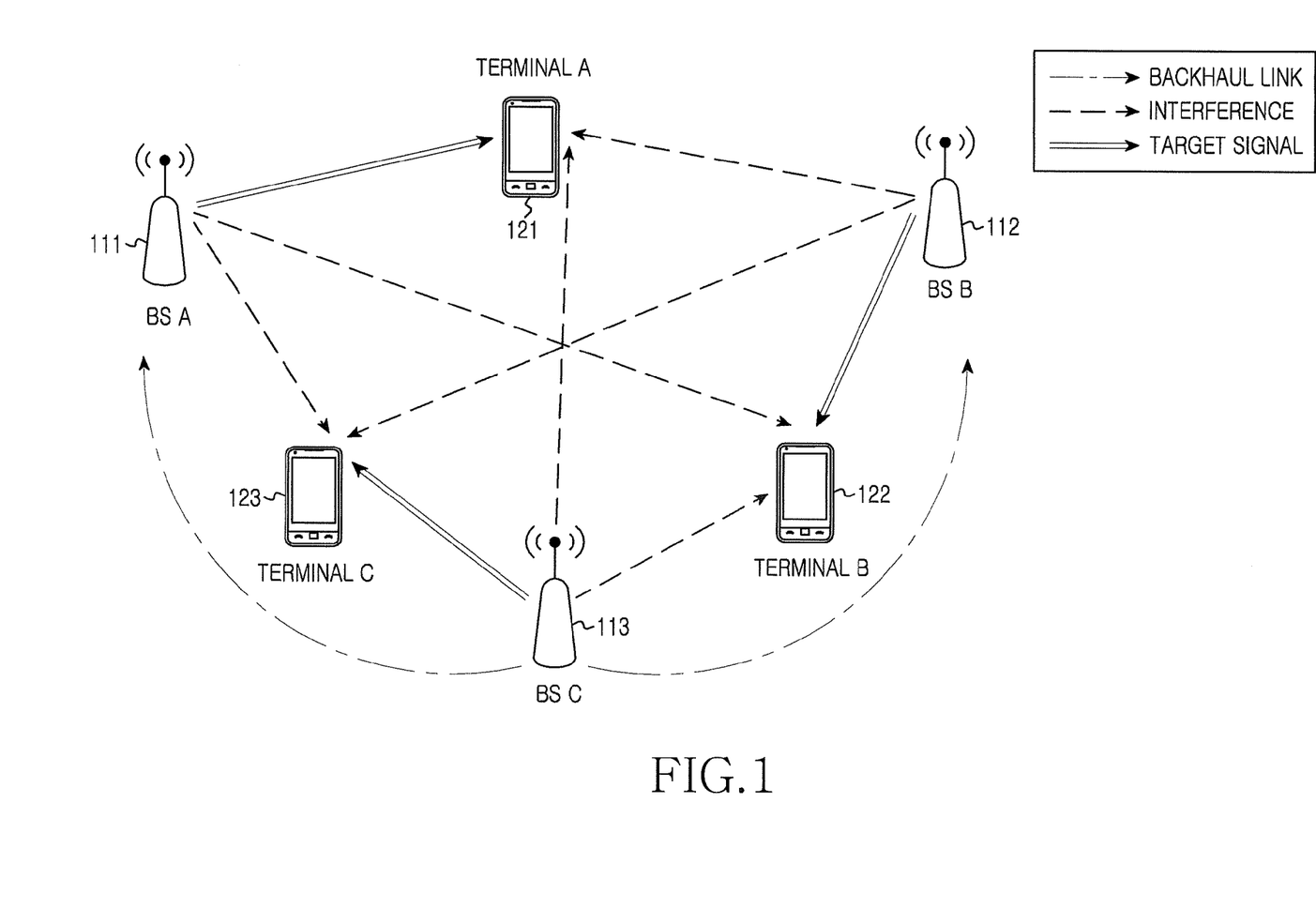
FIG. 1 illustrates base stations and terminals in a wireless communication system according to an embodiment of the present disclosure.

FIG. 1 illustrates base stations and terminals in a wireless communication system according to an embodiment of the present disclosure. Referring to FIG. 1, three base stations 111, 112, 113 are adjacently positioned, and three terminals 121, 122, 123 receive a service using the three base stations as serving base stations, respectively. The base stations 111, 112, 113 may be a macro base station, a dispersed small base station, a femto base station, etc.

A backhaul link is set between the base stations 111, 112, 113. However, information exchange via the backhaul link may be performed between only a portion of the base stations. For example, relation between base stations where information exchange is performed may conform to a predetermined setting or may be determined by a capacity of the backhaul link. For example, in the case where the backhaul link is a wireless link, whether the information exchange is performed may be determined by a capacity limit. Also, even though the backhaul link is a wired link, whether the information exchange is performed may be determined by a capacity limit depending on a network load concentration degree. Alternatively, even without a capacity limit, whether the information exchange is performed may be determined by a communication environment of each cell. For example, the communication environment may include the number of accessed terminals, an interference degree influencing an accessed terminal, etc. Depending on at least one of the above causes, the present disclosure assumes a circumstance where information exchange is mutually performed via a backhaul link between the base station A 111 and the base station C 113, and the base station B 112 and the base station C 113, and information exchange is not performed between the base station A 111 and the base station B 112. That is, the present disclosure assumes a circumstance where cooperation between the base station A 111 and the base station B 112 is not possible.

Accordingly, the base station A 111 and the base station C 113 provide information regarding data to transmit between them and perform a function for relieving interference. Also, the base station B 112 and the base station C 113 provide information regarding data to transmit between them and perform a function for relieving interference. That is, the base station A 111 may relieve an interference by a transmission signal of the base station C 113, the base station B 112 may relieve an interference by a transmission signal of the base station C 113, and the base station C 113 may relieve an interference by transmission signals of both the base station A 111 and the base station B 112. Hereinafter, the present disclosure describes interference relief in an aspect of the base station A 111 and the base station B 112 with reference to FIG. 2.

Figure 2:
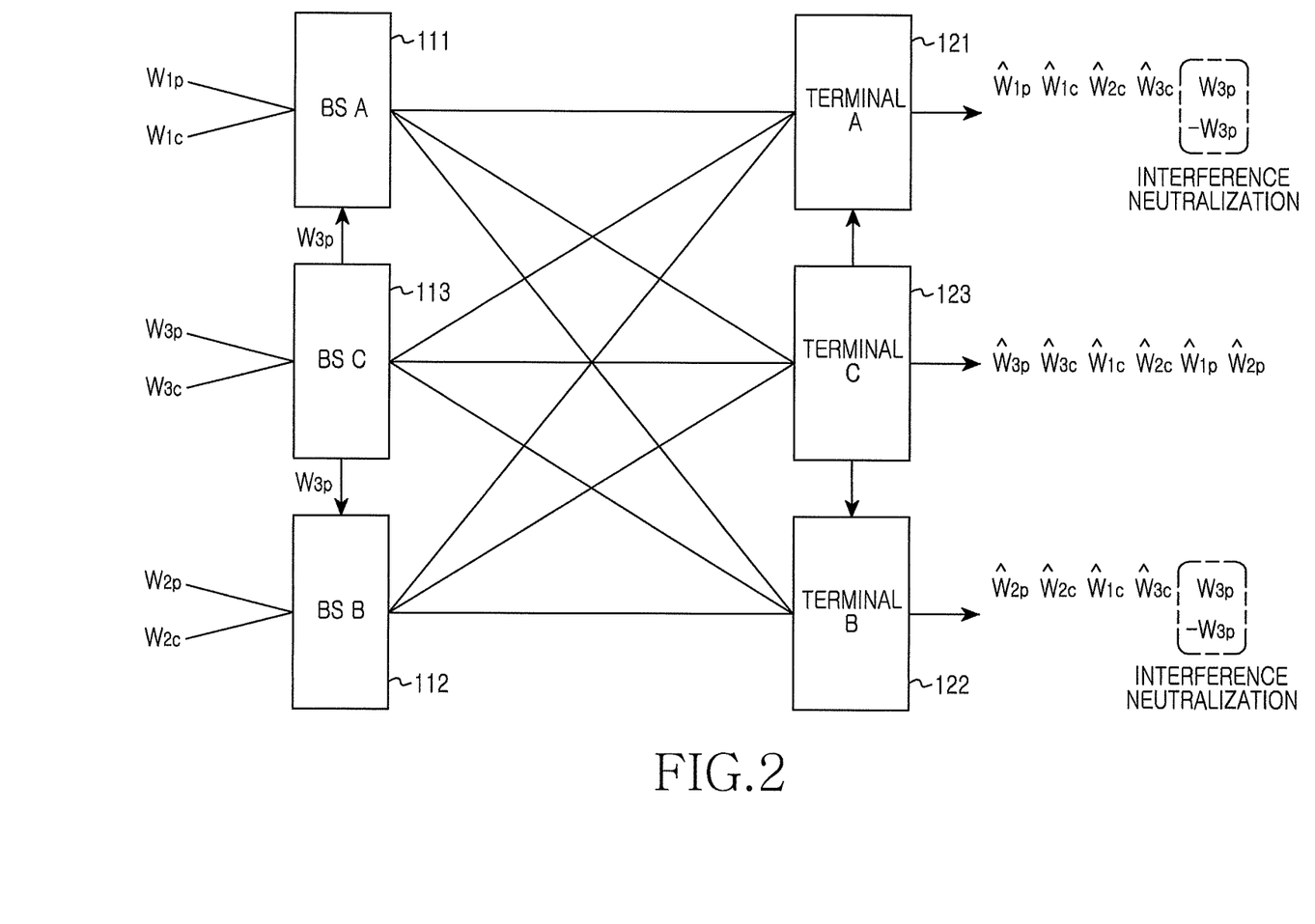
FIG. 2 illustrates transmission data for relieving interference in a wireless communication system according to an embodiment of the present disclosure.

FIG. 2 illustrates transmission data of a super node and a node that does not perform neutralization in a wireless communication system according to an embodiment of the present disclosure. Here, a message denotes a unit of data. The message may be replaced by a terminology such as a 'data block', a 'packet', etc.

The base station A 111, the base station B 112, and the base station C 113 encode a portion of transmission data as a common message and encode the rest of the transmission data as a private message according to a rate divide technique for transmission data of the base station. Accordingly, the base station A 111 generates a common message $w_{1c}$, a private message $w_{1p}$, and the base station B 112 generates a common message $w_{2c}$, a private message $w_{2p}$, and the base station C 113 generates a common message $w_{3c}$, a private message $w_{3p}$. Also, the base station C 113 provides the private $w_{3p}$ to the base station A 111 and the base station B 112 via a backhaul link. For understanding of the disclosure, the rate divide technique is described below.

The rate divide technique denotes a method of dividing a message into partial messages of two kinds and transmitting them. Since a message is divided and transmitted, a data rate when only one unified message is transmitted is obtained as a sum of rates obtained by two partial messages, respectively. One of the two partial messages is a common message. The common message denotes a message encoded such that the common message is decodable by other reception nodes as well as a intended reception node. For this purpose, other reception nodes should know a code book used for generating the common message, that is, common code book information in advance. The other partial message is a private message. Unlike the common message, the private message denotes a message encoded such that private message is decodable by only a intended reception node. That is, other reception nodes cannot know a code book used for encoding the private message or cannot use interference information to perform decoding.

In the case where all messages are private messages under an interference channel environment, since a reception node cannot process a private message to another reception node, the reception node treats interference by the private message as a noise to decode a signal to the reception node. At this point, a data rate that may be obtained by an i-th reception node is given by Equation (1) below.

$$R_i = \log\left(1 + \frac{S}{I + \sigma^2}\right) \quad (1)$$

where $R_i$ is a data rate that may be obtained by an i-th reception node, S is signal intensity, I is interference intensity, and $\sigma^2$ is dispersion of a noise.

At this point, in the case where the interference intensity I is relatively very small compared to the signal intensity S, a desired rate cannot be accomplished. Generally, in case of processing an interference as a noise and performing decoding, a maximum performance may be accomplished when $I \approx \sigma^2$, that is, when an interference intensity has a magnitude similar to a noise intensity.

However, in the case where the interference intensity I is similar to or greater than the signal intensity S, the method of processing the interference as a noise causes a large loss of a rate. As described above, in the case where interference is stronger than signal intensity, the transmission node may effectively reduce a data loss by utilizing the common message. In case of an environment where interference intensity is very large compared to signal intensity, each transmission node configures all messages to transmit using common messages. In case of using the common message, since each reception node may decode interference signals entering from other transmission nodes, each reception node decodes an interference signal whose intensity is strong first with priority prior to decoding a signal to each reception node. In this case, the interference is decoded with a rate of $\log(1+I/(S+\sigma^2))$. When the interference is decoded successfully, each reception node may decode a message to each reception node without an influence of interference. A method of removing interference and performing decoding in this manner is called Successive Interference Cancellation (SIC). For example, in case of an interference channel environment where two users exist, when interference intensity is very weak compared to signal intensity, it is known to provide an optimal performance by treating an interference by a message to other reception nodes as a noise and performing decoding. Therefore, in this case, it is advantageous to transmit a message by utilizing only a private message. On the contrary, in the case where an interference intensity is large compared to a signal intensity, an optimal performance is obtained using SIC. Therefore, in this case, it is advantageous to transmit a message using only a common message.

However, when an interference exists between the above-described two cases, for example, when $I^2+I<S<I$, both S/I and I/S cannot have a large value, so that the method of treating an interference as a noise and performing decoding or the method of decoding a noise first and removing the same has a difficulty in providing a desired performance. In this case, the rate divide method that uses a private message and a common message together depending a circumstance may provide an optimal performance. This is because when a transmission node divides a message into two portions and transmits them and a reception node decodes a common message portion, I in S/I reduces to an interference intensity by a private message and an entire S/I value becomes large. Therefore, when the intensity of interference by a private message is made similar to the magnitude of a noise, in case of considering interference as a noise and performing decoding, each reception node may obtain a maximum performance.

Meanwhile, as a method of performing decoding utilizing a common message, a cooperative decoding method exists besides SIC. The cooperative decoding method is a method of decoding a signal to a reception node and interference simultaneously in the case where the reception node may decode the interference. According to the above SIC, an optimal performance is obtained in the case where an I/S value is sufficiently large and an interference is completely decodable. However, in the case where an I/S value is not very large, since an interference is not completely decoded, a data loss for a message to a reception node may occur, so that the reception node may avoid a loss by decoding the interference and the message together. That is, in case of the cooperative decoding, an i-th reception node may obtain a rate together where a message of an i-th transmission node and interference from a j-th transmission node are given by Equation (2).

$$R_i + R_j = \log\left(1 + \frac{s+I}{\sigma^2}\right) \quad (2)$$

where $R_i$ is a data rate that may be obtained by an i-th reception node, $R_j$ is a data rate that may be obtained by a j-th reception node, S is signal intensity, I is interference intensity, and $\sigma^2$ is dispersion of a noise.

That is, as illustrated in Equation (2), in case of utilizing the cooperative decoding, an i-th reception node may obtain a larger $R_i$ compared to the case of SIC of diving a message and decoding messages, respectively. The cooperative decoding may provide greater performance than SIC except the case where $I > S^2 + S$, that is, an interference is very strong.

Configuring an entire message to transmit using only one of a private message and a common message may be considered as a special case of the rate divide technique of using two partial messages. Therefore, the above contents may be summarized as follows.

First, under an interference channel environment, a transmission node encodes a private message such that an interference by the private message is the same as the magnitude of a noise, and a reception node treats private messages as a noise and decodes a message to the reception node.

Second, under an interference channel environment, a transmission node encodes a common message to obtain an improved or maximum performance via SIC or cooperative decoding depending on a channel environment, and a reception node decodes a message to the reception node under an interference reduced by the decoding of the common message.

In case of an interference channel environment where two users exist, a data rate that may be obtained via the rate divide technique is given by Equation (3) or Equation (4).

$$R_1 \leq \min\left(\log\left(1 + \frac{h_{11}^2 P_{1c}}{h_{11}^2 P_{1p} + h_{12}^2 P_{2p} + \sigma^2}\right),\right.$$
$$\left.\log\left(1 + \frac{h_{21}^2 P_{1c}}{h_{21}^2 P_{1p} + h_{22}^2 P_{2p} + \sigma^2}\right)\right) + \log\left(1 + \frac{h_{11}^2 P_{1p}}{h_{12}^2 P_{2p} + \sigma^2}\right) \quad (3)$$
$$R_2 \leq \min\left(\log\left(1 + \frac{h_{22}^2 P_{2c}}{h_{22}^2 P_{1p} + h_{21}^2 P_{21} + \sigma^2}\right),\right.$$
$$\left.\log\left(1 + \frac{h_{12}^2 P_{2c}}{h_{12}^2 P_{2p} + h_{11}^2 P_{1p} + \sigma^2}\right)\right) + \log\left(1 + \frac{h_{22}^2 P_{2p}}{h_{21}^2 P_{1p} + \sigma^2}\right)$$

where $R_i$ is a data rate that may be obtained by art i-th reception node, $h_{ij}$ is a channel value from a j-th transmission node to an i-th reception node, Pi is existing transmission power, $P_{ic}$ is transmission power of a common message as $(1-k)P_i$, and $P_{ip}$ is transmission power of a private message as $kP_i$.

$$R_1 + R_2 \leq \min\left(\log\left(1 + \frac{h_{11}^2 P_{1c} + h_{12}^2 P_{2c}}{h_{11}^2 P_{1p} + h_{12}^2 P_{2p} + \sigma^2}\right),\right. \quad (4)$$
$$\left.\log\left(1 + \frac{h_{22}^2 P_{2c} + h_{21}^2 P_{1c}}{h_{22}^2 P_{2p} + h_{21}^2 P_{1p} + \sigma^2}\right)\right) +$$
$$\log\left(1 + \frac{h_{11}^2 P_{1p}}{h_{12}^2 P_{2p} + \sigma^2}\right) + \log\left(1 + \frac{h_{22}^2 P_{2p}}{h_{21}^2 P_{1p} + \sigma^2}\right)$$

where $R_i$ is a data rate that may be obtained by an i-th reception node, $h_{ij}$ is a channel value from a j-th transmission node to an i-th reception node, $P_i$ is existing transmission power, $P_{ic}$ is transmission power of a common message as $(1-k)P_i$, and $P_{ip}$ is transmission power of a private message as $kP_i$.

The reception node decodes a common message with priority, and decodes a private message. Equation (3) denotes a case of decoding a common message via SIC to remove an influence of the common message on other reception nodes, and considering private messages to other reception nodes as a noise to perform decoding. Equation (4) denotes a case where each reception node decodes a common message via cooperative decoding to remove an influence of the common message on other reception nodes, and considering, private messages to the other reception nodes as a noise to perform decoding. At this point, the first portion of the function is a rate that may be obtained when each reception node decodes a common message to other transmission nodes entering as an interference first and decodes a common message to the reception node. The second portion of the function is a rate that may be obtained with respect to a common message received as an interference in the case where another reception node decodes a common message to the reception node and decodes a common message received as the interference. In all cases, since a common message is decoded with priority first prior to a private message, private messages act as a noise when the common message is decoded.

In a symmetrical structure where $h_{ij}^2 = h_{ji}^2$ and $p_i = p_j$, an optimal value of a ratio k ($0 \leq k \leq 1$) of a common message to a private message may be determined by Equation (5).

$$k = \begin{cases} 0 & , S > I^2 + I \\ k_{ep} & , S \leq I^2 + I \text{ and } k_{ep} > k_{crs} \\ k_{crs} & , S \leq I^2 + I \text{ and } k_{ep} \leq k_{crs} \\ 1 & S \leq I \end{cases} \quad (5)$$

where k is a ratio of a common message to a private message, $k_{ep}$ and $k_{crs}$ are predetermined ratio values, S is a signal intensity, and I is an interference intensity. Here, the signal intensity S is $h_{ii}^2 P_i$, the interference intensity I is $h_{ij}^2 P_j$, $k_{ep}$ is $1-(S-I/(S+I)I)$, and $K_{crs}$ is $1-(I^2+I-S)/S^2)$.

To obtain an optimal data rate, it is preferable to use an optimal ratio value as in Equation (5). However, as described above, since when an interference by a private message is a degree similar to the magnitude of a noise, an optimal rate approaches, a message may be divided such that a condition of Equation (6) is met for reduction in an amount of operations.

$$h_{ij}^2 P_{jp} = \sigma^2 \quad (6)$$

where $h_{ij}$ is a channel value from a j-th transmission node to an i-th reception node, $p_{jp}$ is transmission power of a private message of a j-th transmission node, and $\sigma^2$ is a dispersion of a noise.

In case of using Equation (6), a difference in a data rate is generated compared to the case of using Equation (5), but the difference becomes small to an ignorable level as transmission power becomes large.

The base station A 111 and the base station B 112 relieve an interference influencing the terminal A 121 and the terminal B 122 via $w_{3p}$ transmitted by the base station C 113 by designing to interference-neutralize $w_{3p}$ provided by the base station C 113. In other words, the base station A 111 multiplies $w_{3p}$ by an appropriate weight such that $w_{3p}$ transmitted by the base station C 113 is canceled in an aspect of the terminal A 121, and transmits the multiplied $w_{3p}$. Also, the base station B 112 multiplies $w_{3p}$ by an appropriate weight such that $w_{3p}$ transmitted by the base station C 113 is canceled in an aspect of the terminal B 122, and transmits the multiplied $w_{3p}$. At this point, $w_{3p}$ multiplied by the weight at the base station A 111 and the base station B 112 is denoted by an interference-neutralize designed message.

That is, the base station A 111 encodes a message $w_i$ to transmit using a common message $w_{1c}$ and a private message $w_{3p}$ via the rate divide technique, and transmits $w_{1c}$, $w_{ip}$, and an interference-neutralize designed $w_{3p}$. Also, the base station B 112 encodes a message $w_2$ to transmit using a common message $w_{2c}$ and a private message $w_{2p}$ via the rate divide technique, and transmits $w_{2c}$, $w_{2p}$, and an interference-neutralize designed $w_{3p}$. Also, the base station C 113 encodes a message $w_3$ to transmit using a common message $w_{3c}$ and a private message $w_{3p}$ via the rate divide technique, and transmits $w_3$, and $w_{3p}$.

In an aspect of the terminal A 121, $w_{1p}$ is canceled due to interference neutralization. Accordingly, the terminal A 121 receives $w_{1p}$, $w_{1c}$, $w_{2p}$, $w_{2c}$, and $w_3$, and decodes messages $w_{1p}$ and $w_{1c}$ to the terminal A 121 and the common messages $w_{2c}$ and $w_{3c}$ to other terminals among them to recover a message of the terminal A 121. At this point, the common messages $w_{2c}$ and $w_{3c}$ to other terminals may be removed via SIC. Also, in an aspect of the terminal B 122, $w_{1p}$ is canceled due to neutralization of an interference. Accordingly, the terminal B 122 receives $w_{2p}$, $w_{2c}$, $w_{1p}$, $w_{1c}$, and $w_{3c}$ and decodes the messages $w_{2p}$ and $w_{2c}$ to the terminal B 122 and the common messages $w_{1c}$ and $w_{3c}$ to the other terminals among them to recover a message of the terminal B 122. At this point, the common messages $w_{1c}$ and $w_{3c}$ to the other terminals may be removed via SIC. In case of the terminal C 123, since interference neutralization is not performed, the terminal C 123 receives $w_{3p}$, $w_{3c}$, $w_{1p}$, $w_{1c}$, $w_{2p}$, and $w_{2c}$ and decodes $w_{3p}$ and $w_{3c}$ to the terminal C 123 and the common messages $w_{1c}$ and $w_{2c}$ to other terminals among them to recover a message of the terminal C 123. At this point, the common messages $w_{ic}$ and $w_{2c}$ to the other terminals may be removed via SIC.

In the above interference relieve procedure, the interference neutralization includes a process of multiplying a private message transmitted by other base stations by weight that considers a channel. At this point, the weight regarding $w_{3p}$ for the terminal A 121 is given by Equation (7).

$$d_{13} = -\frac{h_{22}h_{13} - h_{12}h_{23}}{h_{21}h_{12} - h_{11}h_{22}} \quad (7)$$

where $d_{13}$ is a weight regarding a private message of the third base station, that is, $w_{3p}$ for the first terminal, that is, the terminal A 121, and $h_{ij}$ is a channel value from a j-th base station to an i-th terminal.

Also, a weight regarding $w_{3p}$ for the terminal B 122 is given by Equation (8).

$$d_{23} = -\frac{h_{11}h_{13} - h_{22}h_{13}}{h_{21}h_{12} - h_{11}h_{22}} \quad (8)$$

where $d_{23}$ is a weight regarding a private message of the third base station, that is, $w_{3p}$ for the second terminal, that is, the terminal B 122, and $h_{ij}$ is a channel value from a j-th base station to an i-th terminal.

Since the weights of Equation (7) and Equation (8) should be designed simultaneously, the weights are obtained as solutions of simultaneous equations mathematically. At this point, signals received in respective terminals are given by Equation (9).

$$y_1 = h_{11}(X_{1c}+X_{1p}) + h_{12}(X_{2c}+X_{2p}) + h_{13}(X_{3c}) + n_1$$

$$y_2 = h_{22}(X_{2c}+X_{2p}) + h_{21}(X_{1c}+X_{1p}) + h_{23}(X_{3c}) + n_2$$

$$y_3 = h_{33}(X_{3c}+(1+d_1+d_2)X_{3p}) + h_{31}(X_{1c}+X_{1p}) + h_{32}(X_{2c}+X_{2p}) + n_3 \quad (9)$$

where $y_i$ is a reception signal to an i-th terminal, $h_{ij}$ is a channel value from a j-th base station to an i-th terminal, $X_{jc}$ is a transmission signal of a common message of a j-th base station, $X_{jp}$ is a transmission signal of a private message of a j-th base station, and $n_i$ is a noise received in an i-th terminal.

Referring to Equation (9), it is revealed that a signal corresponding to a private message $w_{3p}$ transmitted from the base station C 113 has been excluded from a reception signal of the terminal A 121 and the terminal B 122. In contrast, in case of a reception signal of the terminal C 123, it is revealed that an interference has not been neutralized.

Figure 3:
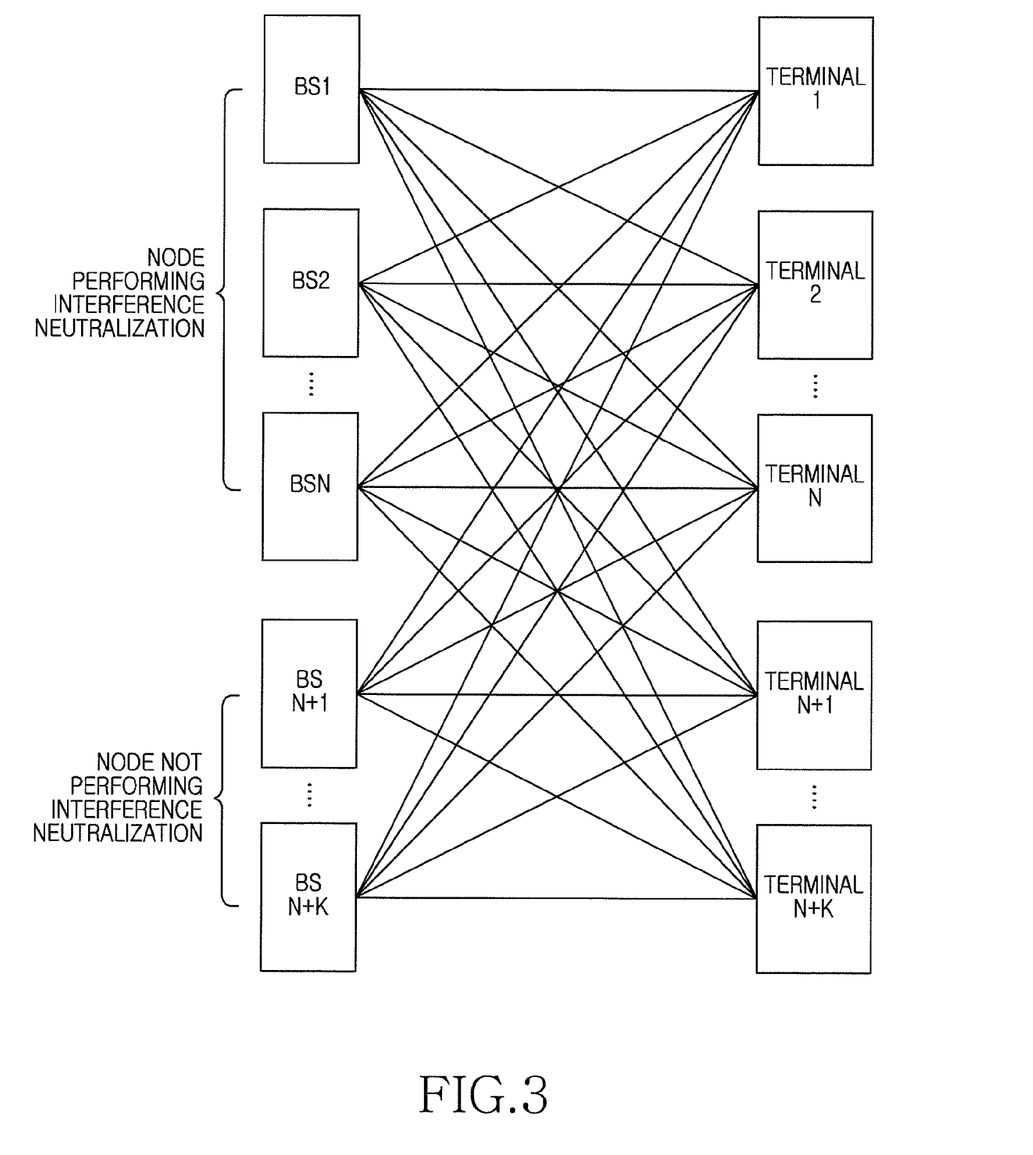
FIG. 3 illustrates a generalized interference relation between base stations and terminals in a wireless communication system according to an embodiment of the present disclosure.

Weight calculation for interference neutralization in an interference relieve procedure according to the above embodiment is generalized as follows. FIG. 3 illustrates a generalized interference relation between base stations and terminals in a wireless communication system according to an embodiment of the present disclosure. As illustrated in FIG. 3, in the case where (N+K) base stations in total including N nodes performing interference neutralization and K nodes not performing interference neutralization exist, each base station configures a common message and a private message based on the rate divide technique. At this point, a weight for interference neutralization is determined by Equation (10).

$$\begin{bmatrix} d_{1j} \\ d_{2j} \\ \vdots \\ d_{N_s j} \end{bmatrix} = \begin{bmatrix} h_{11} & h_{12} & \cdots & h_{1N_s} \\ h_{21} & h_{22} & \cdots & h_{2N_s} \\ \vdots & \vdots & \ddots & \vdots \\ h_{N_s 1} & h_{N_s 2} & \cdots & h_{N_s N_s} \end{bmatrix}^{-1} \begin{bmatrix} -h_{1j} \\ -h_{2j} \\ \vdots \\ -h_{N_s j} \end{bmatrix} \quad (10)$$

where $d_{ij}$ is a weight regarding a private message of a j-th transmission node for an i-th reception node, and h is a channel value from a j-th transmission node to an i-th reception node.

Referring to Equation (10), to remove an interference by a private message of a j-th node not performing interference neutralization, weights to be used by respective nodes performing interference neutralization may be determined via cooperative design.

Hereinafter, the operation and the construction of a transmission node and a reception node relieving an interference as described above are described in detail with reference to the drawing. In the following description, the transmission node corresponds to the base station in the above description, and the reception node corresponds to the terminal in the above description. In the present disclosure, the transmission node denotes an apparatus that transmits a signal via a Radio Frequency (RF) channel such as a relay, a small base station, a macro base station, etc., and the reception node denotes an apparatus that receives a signal via the RF channel such as a relay, a terminal, etc.

Figure 4:
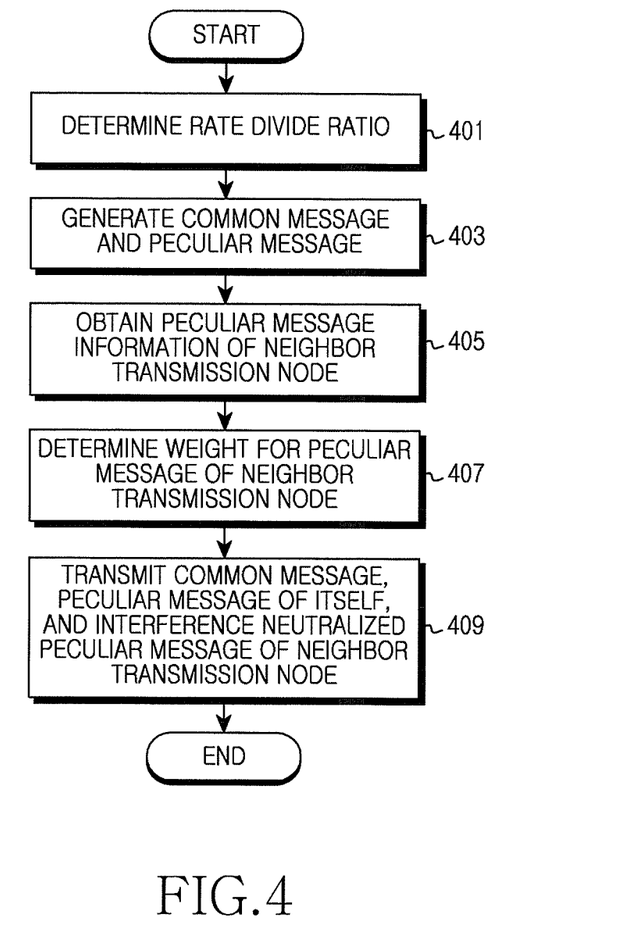
FIG. 4 illustrates a flowchart of a procedure for operating a transmission node in a wireless communication system according to an embodiment of the present disclosure.

FIG. 4 illustrates a flowchart of a procedure for operating a transmission node in a wireless communication system according to an embodiment of the present disclosure.

Referring to FIG. 4, the transmission node determines a divide ratio of a message for rate division in step 401. In other words, the transmission node determines a divide ratio of a portion to be encoded as a common message to a portion to be encoded as a private message among entire transmission data. For example, the transmission node may determine the divide ratio based on at least one of signal intensity, interference intensity, and a noise size. Specifically, the transmission node determines the divide ratio according to Equation (5) or to meet the condition of Equation (6). For example, the transmission node may determine the divide ratio such that an interference by a private message is the same as the magnitude of a noise.

After determining the rate divide ratio, the transmission node proceeds to step 403 to divide transmission data into two portions according to the determined ratio, and generates a common message and a private message. In other words, the transmission node generates a common message by encoding one portion based on a common code book usable by a plurality of reception nodes, and generates a private message by encoding the other portion based on a code book usable by only a reception node that is to receive the transmission data.

After that, the transmission node proceeds to step 405 to obtain private message information of a neighbor transmission node. That is, the transmission node receives private message information to be transmitted by the neighbor transmission node from at least one neighbor transmission node via a backhaul network via which transmission nodes may communicate. Additionally, for interference neutralization of the neighbor transmission node, the transmission node may provide a private message of the transmission node, that is, the private message generated in step 403 to the neighbor transmission node.

After obtaining the private message of the neighbor transmission node, the transmission node proceeds to step 407 to determine a weight regarding the private message of the neighbor transmission node. In other words, the transmission node determines a weight for interference neutralization. For this purpose, the transmission node uses channel values between a plurality of transmission nodes including the transmission node and reception nodes. For this purpose, the transmission node may receive a channel value as a feedback from a reception node, and may be provided with a channel value between another transmission node and reception nodes via a backhaul network. Alternatively, the transmission node may directly estimate a channel value. For example, the weight is determined as the product of an inverse matrix of a matrix consisting of channel values of transmission nodes transmitting a private message of another transmission node and a matrix consisting of channel values of a transmission node providing a private message to another transmission node. Specifically, for example, the transmission node may determine the weight by solving the determinant of Equation (10).

After that, the transmission node proceeds to step 409 to transmit the common message generated in step 403, the private message generated in step 403, and a private message of the neighbor transmission node multiplied by the weight, that is, the interference-neutralize designed private message of the neighbor transmission node. At this point, the three messages are transmitted simultaneously. In other words, physical signals corresponding to the three messages are transmitted simultaneously.

Figure 5:
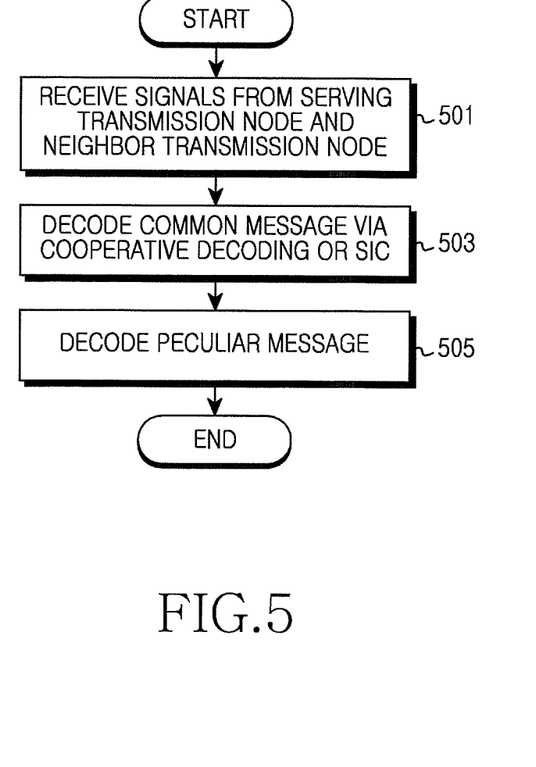
FIG. 5 illustrates a flowchart of a procedure for operating a reception node in a wireless communication system according to an embodiment of the present disclosure.

FIG. 5 illustrates a flowchart of a process for operating a reception node in a wireless communication system according to an embodiment of the present disclosure.

Referring to FIG. 5, the reception node receives signals from a serving transmission node and a neighbor transmission node in step 501. In other words, the reception node receives a desired signal from the serving transmission node and simultaneously receives an interference signal from the neighbor transmission node. At this point, according to an embodiment of the present disclosure, a signal from the serving transmission node include a common message of the serving transmission node, a private message of the serving transmission node, and an interference-neutralize designed private message of the neighbor transmission node. Due to the interference-neutralize designed private message of the neighbor transmission node, a signal corresponding to the private message of the neighbor transmission node is canceled. Here, the interference-neutralize designed private message of the neighbor transmission node denotes the private message of the neighbor transmission node multiplied by a weight. The weight may be determined by solving the determinant of Equation (10).

After receiving the signal, the reception node proceeds to step 503 to decode a common message via cooperative decoding or SIC. In case of using the cooperative decoding, the reception node decodes a common message of the serving transmission node, and a common message of the neighbor transmission node, simultaneously. In case of using SIC, the reception node decodes a common message of the neighbor transmission node first while treating other signals as a noise except the common message of the neighbor transmission node, removes an interference by the decoded common message of the neighbor transmission node from a reception signal, and then decodes a common message of the serving transmission node from the interference-free signal. SIC is effective in the case where the magnitude of an interference is larger than the magnitude of a intended signal, and the cooperative decoding is effective in the case where the magnitude of an interference is not sufficiently large. Therefore, according to an embodiment of the present disclosure, the reception node may select one of SIC and the cooperative decoding depending on a ratio of interference intensity to intensity of a desired signal. According to another embodiment of the present disclosure, the reception node may decode the common message according to a predetermined technique.

Subsequently, the reception node proceeds to step 505 to decode a private message. In decoding the private message, other signals except a private message of the serving transmission node are treated as a noise.

Figure 6:
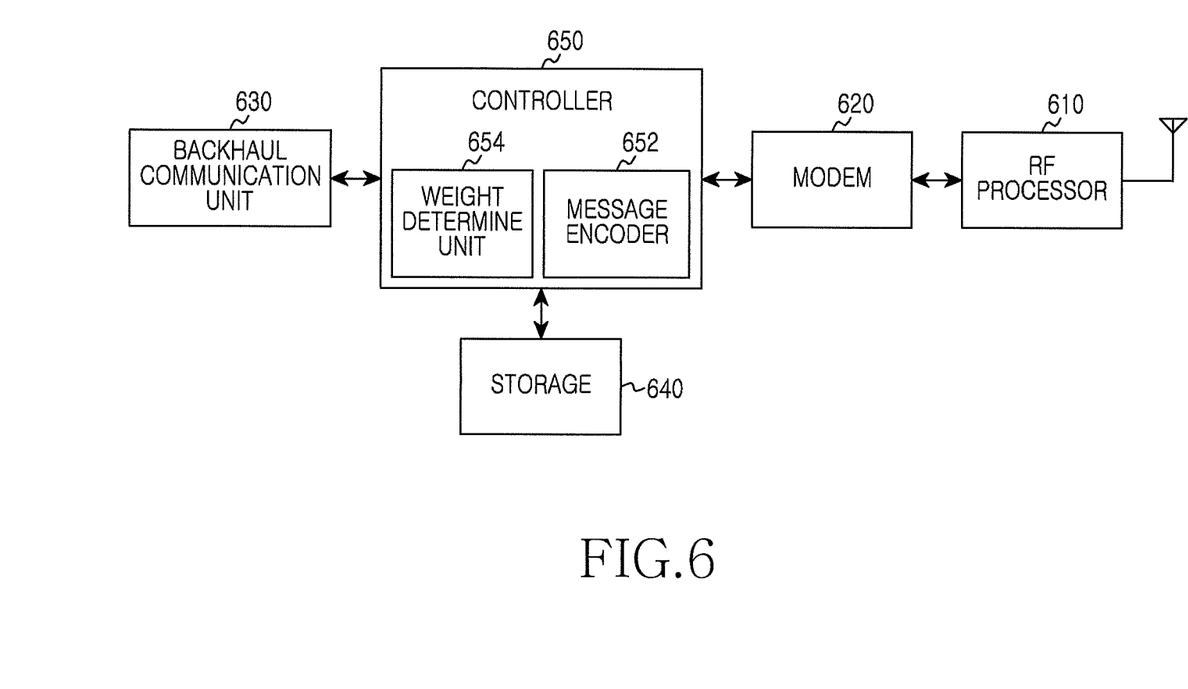
FIG. 6 illustrates a block diagram of a transmission node in a wireless communication system according to an embodiment of the present disclosure.

FIG. 6 illustrates a block diagram of a transmission node in a wireless communication system according to an embodiment of the present disclosure.

As illustrated in FIG. 6, the transmission node includes an RF processor 610, a modem 620, a backhaul communication unit 630, a storage 640, and a controller 650.

The RF processor 610 performs a function for transmitting/receiving a signal via an RF channel such as band conversion, amplification of a signal, etc. That is, the RF processor 610 up-converts a baseband signal provided from the modem 620 to an RF signal, transmits the RF signal via an antenna, and down-converts an RF signal received via the antenna to a baseband signal. For example, the RF processor 610 may include an amplifier, a mixer, an oscillator, a Digital-to-Analog Converter (DAC), an Analog-to-Digital Converter (ADC), etc.

The modem 620 performs a function of conversion between a baseband signal and a bit string according to a physical layer standard of the system. For example, during data transmission, the modem 620 encodes and modulates a transmission bit string to generate complex symbols. Also, during data reception, the modem 620 recovers a reception bit string via demodulation and decoding of a baseband signal provided from the RF processor 610.

The backhaul communication unit 630 provides an interface for performing communication with other nodes inside the system. That is, the backhaul communication unit 630 converts a bit string transmitted from the transmission node to another node, for example, another transmission node, etc. to a physical signal, and converts a physical signal received from another node to a bit string. For example, the backhaul communication unit 630 supports a wired or wireless interface. The storage 640 stores a basic program for an operation of the transmission node, an application, and data such as setting information, etc. For example, the storage 640 stores a codebook for message encoding. Also, the storage 640 provides stored data according to a request of the controller 650.

The controller 650 controls an overall operation of the transmission node. The controller 650 includes a message encoder 652. The message encoder 652 encodes a common message and a private message using a codebook stored in the storage 640. Also, according to an embodiment of the present disclosure, the controller 650 includes a weight determine unit 654. The weight determine unit 654 determines a weight for interference neutralization. An operation of the controller 650 according to an embodiment of the present disclosure is described below in detail.

First, the controller 650 determines a divide ratio of a message for rate division. For example, the controller 650 may determine the divide ratio such that an interference by a private message is the same as the magnitude of a noise. After that, the controller 650 divides transmission data into two portions according to the determined ratio, and generates a common message and a private message. After that, the controller 650 obtains private message information of a neighbor transmission node via the backhaul communication unit 630. Additionally, for interference neutralization of the neighbor transmission node, the controller 650 may provide a private message of the transmission node to the neighbor transmission node. Also, the controller 650 determines a weight for interference neutralization. For this purpose, the controller 650 uses channel values between a plurality of transmission nodes including the transmission node and reception nodes. For example, the controller 650 determines the weight by solving the determinant of Equation (10). After that, the controller 650 transmits the common message, the private message, and the private message of the neighbor transmission node multiplied by the weight.

Figure 7:
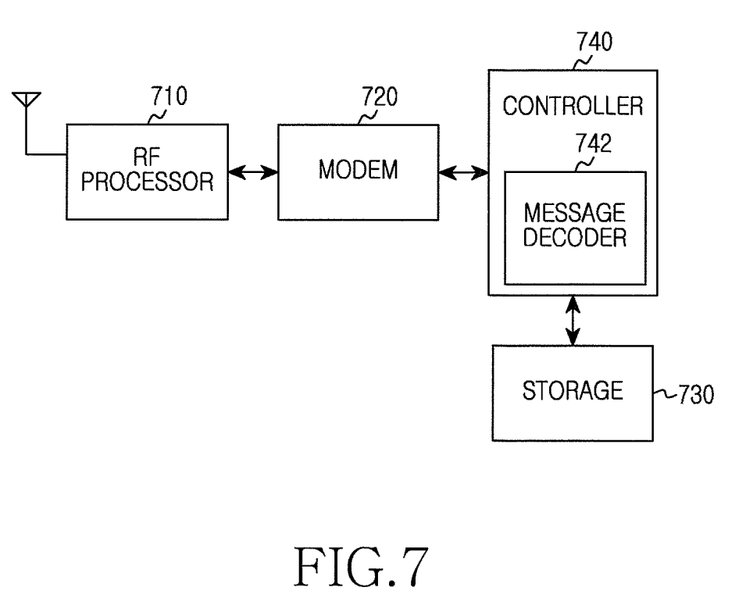
FIG. 7 illustrates a block diagram of a reception node in a wireless communication system according to an embodiment of the present disclosure.

FIG. 7 illustrates a block diagram of a reception node in a wireless communication system according to an embodiment of the present disclosure.

As illustrated in FIG. 7, the reception node includes an RF processor 710, a modem 720, a storage 730, and a controller 740.

The RF processor 710 performs a function for transmitting/receiving a signal via an RF channel such as band conversion, amplification of a signal, etc. That is, the RF processor 710 up-converts a baseband signal provided from the modem 720 to an RF signal, transmits the RF signal via an antenna, and down-converts an RF signal received via the antenna to a baseband signal. For example, the RF processor 710 may include an amplifier, a mixer, an oscillator, a Digital-to-Analog Converter (DAC), an Analog-to-Digital Converter (ADC), etc.

The modem 720 performs a function of conversion between a baseband signal and a bit string according to a physical layer standard of the system. For example, during data transmission, the modem 720 encodes and modulates a transmission bit string to generate complex symbols. Also, during data reception, the modem 720 recovers a reception bit string via demodulation and decoding of a baseband signal provided from the RF processor 710. The storage 730 stores a basic program for an operation of the reception node, an application, and data such as setting information, etc. For example, the storage 730 stores a codebook for message decoding. Also, the storage 730 provides stored data according to a request of the controller 740.

The controller 740 controls an overall operation of the reception node. The controller 740 includes a message decoder 742. The message decoder 742 decodes a common message and a private message using a codebook stored in the storage 730. At this point, the message decoder 742 performs SIC or cooperative decoding on a common message. An operation of the controller 740 according to an embodiment of the present disclosure is described below in detail.

The controller 740 receives a signal from a serving transmission node and a neighbor transmission node via the RF processor 710 and the modem 720. At this point, according to an embodiment of the present disclosure, the signal from the serving transmission node includes a common message of the serving transmission node, a private message of the serving transmission node, and an interference-neutralize designed private message of the neighbor transmission node. After that, the controller 740 decodes the common message via cooperative decoding or SIC. According to an embodiment of the present disclosure, the controller 740 may select one of SIC and cooperative decoding depending on a ratio of an interference intensity to a desired signal intensity, or decodes the common message according to a predetermined technique. Subsequently, the controller 740 decodes a private message.

In a system where mutual cooperation between base stations is possible, interference neutralized reception nodes may perform decoding without influence of an interference by a private message unlike the conventional rate divide method. Also, since an interference by a common message may be removed via SIC or cooperative decoding, an influence of an interference may be reduced and accordingly it is more advantageous in an aspect of a degree of freedom. Also, the present disclosure reduces or minimizes a power loss generated when interference neutralization is used by using the rate division.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising, code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A method for operating a transmission node in a wireless communication system, the method comprising:
   encoding a portion of data to be transmitted to an intended reception node as a first common message;
   encoding a remaining portion of the data to be transmitted to the intended reception node as a first private message;
   receiving a second private message encoding a portion of transmission data of a neighbor transmission node, wherein a remaining portion of the transmission data of the neighbor transmission node is encoded, by the neighbor transmission node, as a second common message;
   determining a weight for canceling the second private message of the neighbor transmission node received in the intended reception node;
   transmitting the second private message of the neighbor transmission node multiplied by the weight, the first common message, and the first private message,
   wherein the first common message and the second common message are decodable by other reception nodes and the intended reception node, and the first private message is decodable by the intended reception node,
   wherein the second common message is transmitted, by the neighbor transmission node, to the intended reception node and decoded by the intended reception node.

2. The method of claim 1, wherein determining the weight comprises determining the weight using channel values between transmission nodes and reception nodes.

3. The method of claim 2, wherein determining the weight comprises determining the weight as a product of an inverse matrix of a matrix including channel values of transmission nodes transmitting a private message of another transmission node, and a matrix including channel values of a transmission node providing a private message to another transmission node.

4. The method of claim 3, wherein determining the weight comprises using an Equation below:

$$\begin{bmatrix} d_{1j} \\ d_{2j} \\ \vdots \\ d_{N_s j} \end{bmatrix} = \begin{bmatrix} h_{11} & h_{12} & \ldots & h_{1N_s} \\ h_{21} & h_{22} & \ldots & h_{2N_s} \\ \vdots & \vdots & \ddots & \vdots \\ h_{N_s 1} & h_{N_s 2} & \ldots & h_{N_s N_s} \end{bmatrix}^{-1} \begin{bmatrix} -h_{1j} \\ -h_{2j} \\ \vdots \\ -h_{N_s j} \end{bmatrix}$$

Where $N_s$ denotes a number of nodes, $d_{ij}$ is a weight regarding a private message of a j-th transmission node for an i-th reception node, and $h_{ij}$ is a channel value from a j-th transmission node to an i-th reception node.

5. The method of claim 1, further comprising:
   determining a divide ratio for dividing the data to be transmitted to the intended reception node between the first common message and the first private message based on at least one of a signal intensity, an interference intensity, or a noise magnitude.

6. The method of claim 1, wherein a divide ratio is determined such that interference by the first private message is the same as a noise magnitude.

7. A method for operating a reception node in a wireless communication system, the method comprising:
   receiving a first signal from a serving transmission node and a second signal from a neighbor transmission node;
   decoding a first common message of the serving transmission node;
   decoding a first private message of the serving transmission node,
   decoding a second common message of the neighbor transmission node included in the second signal,
   wherein the first common message and second common message are decodable by other reception nodes and the reception node, and the first private message of the serving transmission node is decodable by the reception node, and
   wherein the first signal received from the serving transmission node comprises the first common message of the serving transmission node, the first private message of the serving transmission node, and a second private message of the neighbor transmission node multiplied by weight for canceling the second private message of the neighbor transmission node; and
   canceling an interference of the second private message in the second signal based on the second private message of the neighbor node multiplied by the weight.

8. The method of claim 7, wherein the weight is determined using channel values between transmission nodes and reception nodes.

9. The method of claim 8, wherein the weight is determined as the product of an inverse matrix of a matrix including channel values of transmission nodes transmitting a private message of another transmission node, and a matrix including channel values of a transmission node providing a private message to another transmission node.

10. The method of claim 9, wherein the weight is determined using an Equation below:

$$\begin{bmatrix} d_{1j} \\ d_{2j} \\ \vdots \\ d_{N_s j} \end{bmatrix} = \begin{bmatrix} h_{11} & h_{12} & \cdots & h_{1N_s} \\ h_{21} & h_{22} & \cdots & h_{2N_s} \\ \vdots & \vdots & \ddots & \vdots \\ h_{N_s 1} & h_{N_s 2} & \cdots & h_{N_s N_s} \end{bmatrix}^{-1} \begin{bmatrix} -h_{1j} \\ -h_{2j} \\ \vdots \\ -h_{N_s j} \end{bmatrix}$$

where $N_s$ denotes a number of nodes, $d_{ij}$ is a weight regarding a private message of a j-th transmission node for an i-th reception node, and $h_{ij}$ is a channel value from a j-th transmission node to an i-th reception node.

11. A transmission node apparatus in a wireless communication system, the apparatus comprising:
a backhaul communication unit configured to receive a second private message encoding a portion of transmission data of a neighbor transmission node;
a controller configured to encode a portion of data to be transmitted to an intended reception node as a first common message, encode a remaining portion of the data to be transmitted to the intended reception node as a first private message, and determine a weight for canceling the second private message of the neighbor transmission node received in the intended reception node, wherein a remaining portion of the transmission data of the neighbor transmission node is encoded, by the neighbor transmission node, as a second common message; and
a modem configured to transmit the second private message of the neighbor transmission node multiplied by the weight, the first common message, and the first private message,
wherein the first common message and the second common message are decodable by other reception nodes and the intended reception node, and the first private message is decodable by the intended reception node.

12. The apparatus of claim 11, wherein the controller is configured to determine the weight using channel values between transmission nodes and reception nodes.

13. The apparatus of claim 12, wherein the controller is configured to determine the weight as a product of an inverse matrix of a matrix including channel values of transmission nodes transmitting a private message of another transmission node, and a matrix including channel values of a transmission node providing a private message to another transmission node.

14. The apparatus of claim 13, wherein the controller is configured to determine the weight using an Equation below:

$$\begin{bmatrix} d_{1j} \\ d_{2j} \\ \vdots \\ d_{N_s j} \end{bmatrix} = \begin{bmatrix} h_{11} & h_{12} & \cdots & h_{1N_s} \\ h_{21} & h_{22} & \cdots & h_{2N_s} \\ \vdots & \vdots & \ddots & \vdots \\ h_{N_s 1} & h_{N_s 2} & \cdots & h_{N_s N_s} \end{bmatrix}^{-1} \begin{bmatrix} -h_{1j} \\ -h_{2j} \\ \vdots \\ -h_{N_s j} \end{bmatrix}$$

where $N_s$ denotes a number of nodes, $d_{ij}$ is a weight regarding a private message of a j-th transmission node for an i-th reception node, and $h_{ij}$ is a channel value from a j-th transmission node to an i-th reception node.

15. The apparatus of claim 11, wherein the controller is configured to determine a divide ratio for dividing the data to be transmitted to the intended reception node between the common message and the second private message based on at least one of a signal intensity, an interference intensity, or a noise magnitude.

16. The apparatus of claim 11, wherein a divide ratio is determined such that interference by the first private message is the same as a noise magnitude.

17. A reception node apparatus in a wireless communication system, the apparatus comprising:
a modem configured to receive a first signal from a serving transmission node and a second signal from a neighbor transmission node; and
a controller configured to decode a first common message of the serving transmission node, decode a first private message of the serving transmission node, and decode a second common message of the neighbor transmission node included in the second signal,
wherein the first common message and second common message are decodable by other reception nodes and the reception node, and the first private message of the serving transmission node is a message decodable by the reception node, and
wherein the first signal received from the serving transmission node comprises the first common message of the serving transmission node, the first private message of the serving transmission node, and a second private message of the neighbor transmission node multiplied by weight for canceling the second private message of the neighbor transmission node received from the neighbor transmission node, and wherein the controller is configured to cancel an interference of the second private message in the second signal based on the second private message of the neighbor node multiplied by the weight.

18. The apparatus of claim 17, wherein the weight is determined using channel values between transmission nodes and reception nodes.

19. The apparatus of claim 18, wherein the weight is determined as the product of an inverse matrix of a matrix including channel values of transmission nodes transmitting a private message of another transmission node, and a matrix including channel values of a transmission node providing a private message to another transmission node.

20. The apparatus of claim 19, wherein the weight is determined using an Equation below:

$$\begin{bmatrix} d_{1j} \\ d_{2j} \\ \vdots \\ d_{N_s j} \end{bmatrix} = \begin{bmatrix} h_{11} & h_{12} & \cdots & h_{1N_s} \\ h_{21} & h_{22} & \cdots & h_{2N_s} \\ \vdots & \vdots & \ddots & \vdots \\ h_{N_s 1} & h_{N_s 2} & \cdots & h_{N_s N_s} \end{bmatrix}^{-1} \begin{bmatrix} -h_{1j} \\ -h_{2j} \\ \vdots \\ -h_{N_s j} \end{bmatrix}$$

where $N_s$ denotes a number of nodes, $d_{ij}$ is a weight regarding a private message of a j-th transmission node for an i-th reception node, and $h_{ij}$ is a channel value from a j-th transmission node to an i-th reception node.

* * * * *